Patented Oct. 10, 1939

2,175,985

UNITED STATES PATENT OFFICE 2,175,985

AUTOMATIC CONTROL OF VARIABLE PHYSICAL CHARACTERISTICS

Albert Callender and Allan Brown Stevenson, Northwich, England, assignors to Imperial Chemical Industries Limited, a corporation of Great Britain Application February 17, 1936, Serial No. 64,336
In Great Britain February 13, 1935

14 Claims. (Cl. 236—78)

This invention relates to the automatic control of variable physical characteristics, for example temperature or pressure, and more particularly to the achievement of this aim by a system which is entirely or substantially entirely electrical in operation.

The essential desideratum in the type of automatic control system here proposed is that any deviation (θ) of the characteristic, as indicated, from its desired or set standard value, shall operate compensating means in such a way that the compensating effect (V), resulting from the operation of the compensating means, shall be dependent upon the behaviour of θ, in accordance with some particular chosen law.

If the compensating effect V is applied in direct proportion to the magnitude of the deviation θ, over-compensation will inevitably result. To eliminate the consequent hunting and instability of the system, the compensating effect is additionally regulated in accordance with other characteristics of the deviation in order to bring the system back to the desired balanced condition as rapidly as possible. These characteristics include in particular the rate of deviation (which may be indicated mathematically by the time-derivative of the deviation) and also the summation or quantitative total change of the deviation over a given time (which may be indicated mathematically by the time-integral of the deviation). This principle of control of the compensating effect may be based upon a mathematical formula incorporating the indicated characteristics. A formula of this type is set forth hereafter, together with certain variations therein.

An object of the invention is to provide a control which will apply a compensating effect in accordance with the principles indicated, and preferably which may be arranged to follow with accuracy a mathematical law incorporating said principles. A further object is to provide an electrical system operating in said manner; and more specifically, to provide the simplest possible elements in such an electrical system such as resistances and condensers, which may be readily interchanged or adjusted. The system likewise is adapted to be designed with a minimum of moving parts.

An important feature of the invention is the arrangement of a system which will operate in the manner indicated through changes in potential, the various rate and quantitative factors being provided by suitable adjustment of leakage rates through appropriately selected and arranged parts of the circuits, this type of system being extremely simple to construct and adjust, and being exceptionally free from mechanical and electrical difficulties.

A specific object of the invention is to provide a system which will produce a compensating effect governed by factors proportional to the total extent of the deviation, the rate of the deviation and the summation of the deviation during a given period, as indicated above. A further purpose of the invention is to provide an electrical system which will apply a compensating effect in accordance with factors corresponding to the extent of the deviation and the summation of the deviation.

The effectiveness of the system may be enhanced for certain purposes by the addition of an exponential factor which is sometimes desirable inasmuch as it produces a temporarily exaggerated compensation whenever the characteristic to be controlled changes suddenly; and a feature of the invention is the introduction of this factor together with suitable apparatus, and, in a preferred embodiment, suitable electrical apparatus, for superposing this factor upon the other factors already indicated.

It has been found that control apparatus functioning in accordance with the above indicated principles should include the following elements:

(a) An indicator of the quantity under control, which provides a physical change in position or intensity proportional to the deviation θ.

(b) A compensating means (for example, a steam valve where the physical characteristic to be controlled is temperature) for making compensatory changes in the quantity under control and operated, for instance, by a reversible motor, whose operation is directed by an electrical control system.

(c) A coupling means by which changes in position of the compensating means are translated by interchanges in the electrical system by an amount sensibly proportional to the changes in compensating effect into changes of potential or current flow at a tapping point.

(d) An electrical control system including the tapping point X and a terminal point P, together with suitable electrical means varying the potential at P in accordance with the indicated principles covering the desired rate of application of the compensating effect.

(e) Means for converting the resultant change of potential at P into a physical change in position or intensity of the same nature as that provided by (a) above.

A further purpose of the invention is to provide an arrangement of the type indicated in which the compensating means may be controlled in accordance with any reasonable desired behavior of the characteristic. For example, the system may be applied to the automatic control of a temperature which is required to change with time.

In a further extension of the system the action of the coupling means may be modified or varied in accordance with changes in the magnitude of a further characteristic, hereinafter referred to as a causal characteristic, the variations of which may be expected to lead to variations of the characteristic to be controlled. For instance, where the characteristic under control is temperature, the causal characteristic may be pressure.

A further feature includes the incorporation of means for compensating for backlash or lost motion between the actuation of the compensating means and its controlling effect. This is accomplished in general by providing a delay between the commencement of motion of the compensating means (when opposite to the preceding movement) and the corresponding change in the electrical control system.

The invention likewise includes the incorporation of means such as a suitably calibrated resistance for applying to the electrical control system a change, such as a change in potential, which is sensibly proportional to the change in the compensating effect rather than to the movement of the compensating means.

Other objects and advantages will appear and be considered in connection with the accompanying drawings, illustrating certain preferred embodiments of the invention, in which—

Figure 1:
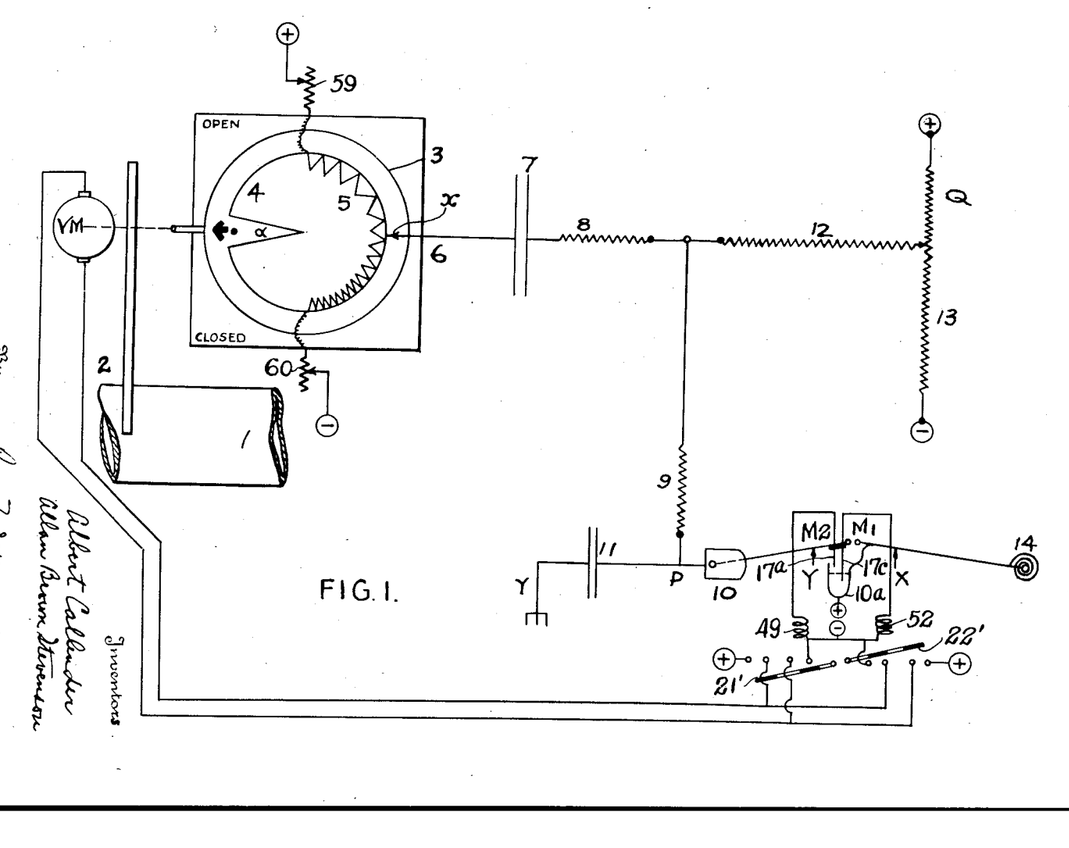
Fig. 1 is a diagram illustrating the fundamental principles of the invention and an arrangement of electrical apparatus suitable for its operation.

Referring to Fig. 1, the supply of heating medium, e. g., steam, to the system the temperature of which is to be controlled, is via a pipe 1 having a regulating valve 2, this valve being operated by a motor and reduction gearing which are not shown in this figure of the drawings. Such a motor is indicated diagrammatically in Fig. 2 at VM. The indicator of the valve carries a wheel 3. A second wheel 4, coaxial with 3, is connected to the latter by an adjustable pin and slot device so as to permit of a small predetermined amount of free relative movement of the two wheels, indicated by the angle $\alpha$; this free movement is adjusted to correspond to the backlash between the point of attachment of the valve indicator and the valve itself. The wheel 4 carries the resistance 5 of a potentiometer system. A potential dependent upon the setting of the valve is thus impressed on the fixed contact arm 6, corresponding to the point X previously referred to.

Contact arm 6 is connected to one plate of a condenser 7, the other plate of which is connected via resistances 8 and 9 to a suitable indicator 10 of the potential at point P which provides in member $M_2$ a displacement of its end sensibly proportional in this example to the deviation $\phi$ in the potential at P and corresponds to the device (e) before described. Point P is itself connected to one plate of a condenser 11, the other plate of which is connected to a point Y, the potential of which is kept constant, e. g., earthed.

At the junction point of resistances 8 and 9, a further resistance 12 branches off to point Q, the potential at which is maintained by means of potentiometer 13 at a value corresponding to the desired value of the temperature. The deviation $\theta$ of temperature from its desired value is indicated by the deviation of the member $M_1$, which is sensibly proportional in this example to $\theta$. By providing a thimble 10a containing mercury at the extremity of member $M_1$ and a 4-point contact system of the kind described in British Patent Specification No. 440,115 at the extremity of $M_2$ and thus actuating the motor operating the compensating means the maintenance of the desired continuing registry between $M_1$ and $M_2$ is obtained.

This arrangement is illustrated diagrammatically in Fig. 1, in which $M_1$ is provided with a mercury cup 10a. The member $M_2$ carries insulated points 17a and 17c connected through the windings of relays 49 and 52 (corresponding to the windings $s_1$ and $s_2$ of said British patent) to the other side of the supply. Armatures 21' and 22' are suitably connected to the motor VM and operate said motor in the appropriate direction as indicated in said patent, the operation corresponding to that described in detail in connection with Fig. 2. Assume that when the temperature rises the indicator arm $M_1$ rises and that when the temperature falls said arm falls. When the temperature as shown by the indicator is correct the system is at rest, that is, point 17c is submerged in the mercury in cup 10a while 17a is located directly above the surface of the mercury. If the temperature rises contact is made between point 17a and the mercury, thereby energizing relay 49 and permitting current to flow to the servomotor VM in such a direction that the valve is moved in the direction of closing, thus bringing about a compensating effect by restricting the flow of steam through pipe 1. The movement of the valve rotates potentiometer 5, say clockwise, and changes the potential applied thereby at X.

Assume that this change of potential is an increase. The increase of potential at X produces a corresponding increase of potential on the right hand side of the condenser 7 and at the point P. The increase of potential at P moves the current-responsive member $M_2$ upwardly, that is following the direction of the previous movement of $M_1$. Point 17a thus tends to break contact with the mercury in cup 10a; and if the temperature has meanwhile ceased to rise, such contact will be broken, relay 49 will be de-energized and the servomotor will stop.

If the temperature remains steady in the incorrect (high) value the next thing that happens is that point 17a again makes contact with the mercury owing to the loss of potential at P due to the leak to Q, which causes M₂ to move downwardly.

Thus after the first make and break at M₁, M₂, and if M₁ is still high, a second make occurs, followed by a break as before. This sequence is repeated so long as M₁ is above the value corresponding to the predetermined setting of M₂ (controlled by potential at Q). Thus the servomotor runs discontinuously to displace the compensating means (valve 2) step by step so as to apply the necessary correction to cause M₁ to be restored to the desired value.

A similar sequence takes place if the temperature falls, when M₁ falls and contact is broken between the mercury and point 17c. This de-energizes relay 52 and permits armature 22' to fall, causing the servomotor to run in the opposite direction to move the valve 2 in the direction of opening. The potentiometer 5 is now rotated counter-clockwise and the potential at X falls, leading to a fall in potential at P. This causes the member M₂ to move downwardly, tending to make contact between point 17c and the mercury. As the potential at P is now below the standard value, current passes to it from point Q until it is restored. This brings about repeated operation of the relay 52 so long as the temperature is below the desired value, in a similar manner to that described for the case where the temperature is too high.

As the potential at P constantly tends to that at Q, member M₂ also constantly tends to return to a standard position. The system can only be in equilibrium when the level of the mercury in cup 10a is between points 17a and 17c; and therefore after every disturbance the compensating means is varied until the correct temperature is restored. The compensating means can take up any equilibrium position within its working range without the necessity for adjustment of any part of the apparatus.

Over a given period of time the applied change of compensating effect is dependent upon the number and duration of the contacts made between M₁ and M₂.

It can be shown that the apparatus of Fig. 1 obeys a control law expressed by the equation $$-V = k_1 \int \theta dt + k_2 \theta + k_3 \frac{d\theta}{dt}$$

where
 $-V$ is the compensating effect
 $\theta$ is the deviation of the temperature
 $t$ is time
 $k_1$, $k_2$ and $k_3$ are constants.

If resistances 8, 9, condenser 11 and its earth connections are omitted $k_3$ is equal to zero and the control reduces to $$-V = k_1 \int \theta dt + k_2 \theta$$

Although the three portions of the electrical system do not behave independently, it is nevertheless substantially true (1) that the condenser 7 provides a term in the law proportional to $\theta$; (2) the addition of resistance 12 provides a term proportional to $$\int \theta dt$$

and (3) the further addition of condenser 11 and resistances 8 and 9 provides a term proportional to $$\frac{d\theta}{dt}$$

The choice of the values of condenser 7, resistances 8, 9 and 12, and condenser 11, determines the values of the three constants of proportionality $k_1$, $k_2$ and $k_3$ which have been previously selected in accordance with the particular nature of the system under control. The sum of these three terms of potential $$\left(k_1 \int \theta dt + k_2 \theta + k_3 \frac{d\theta}{dt}\right)$$

is equated at X to a value of potential which is proportional to the compensating effect in contra fashion, i. e., to $-V$.

The function of condenser 11 is to impart to the control system a correction corresponding to the term $$k_3 \frac{d\theta}{dt}$$

The current into the condenser is equal to the capacity of condenser 11 multiplied by the rate of change of the potential at P, which latter quantity is proportional to the rate of change of the indicated temperature, that is, $$\frac{d\theta}{dt}$$

The apparatus described in connection with Fig. 2 functions in essentially the same way as the arrangement indicated in Fig. 1, and employs the same basic circuit. The principal changes include the addition of means for straight amplification of the movements of the indicator M₁; the elaboration of the device indicated diagrammatically at 10; and replacement of the simple relay system 49, 52 by a thermionic relay and mercury switch system.

Figure 2:
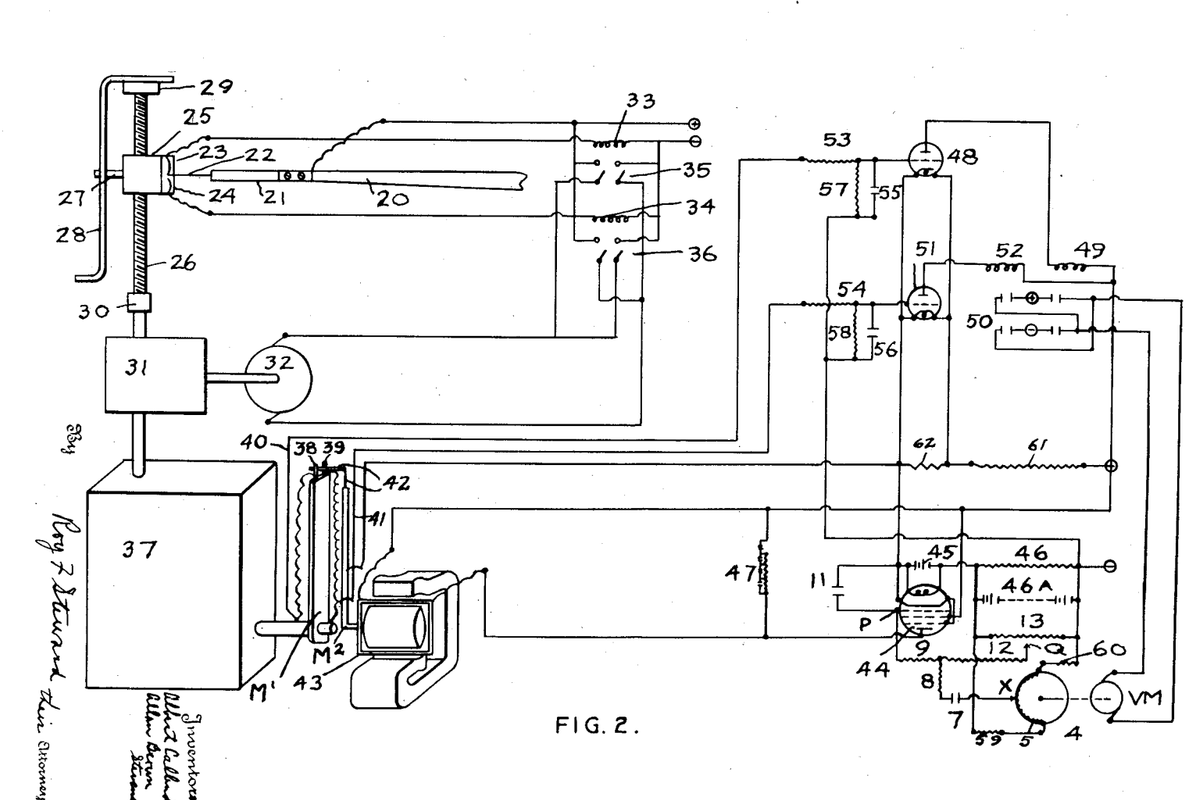
Fig. 2 is an elaborated and somewhat modified system incorporating the principles and arrangement indicated in Fig. 1.

Referring to Fig. 2, the arrangement for amplification of the movement of the indicator M₁ includes the parts numbered 20—39. In this figure the indicator illustrated by the thermometer arm 20 carries at its insulated extremity a light aluminium extension 21 and to this is connected a platinum wire 22, which floats in a small gap between two silver contacts 23, 24. These are carried on a synthetic resin block 25 with a tapped thread of say, ¼" Whitworth, into which there fits a similarly screwed spindle 26 having, say, 20 threads per inch. As the spindle rotates, the contact block 25 moves vertically, being constrained by a pin 27 which fits in a vertical slot in the guide 28. This guide terminates in a horizontal plate at the top, carrying the bearing 29 to the upper end of the spindle 26. At the bottom the spindle fits in a coupling 30, arranged to be driven by the reduction gear 31 at a speed of, say, 5 R. P. M. from the servomotor 32, when the latter is put in action.

This servomotor is caused to drive the contact block 25 so as to follow the free movement of the thermometer arm 20 by the action of two small relays whose coils are indicated at 33 and 34, which coils are included in the respective branches of a relay circuit arranged to be energised by contact of 22 with either of the contacts 23 or 24, the respective relay then closing the power circuit of servomotor, 32, at the respective switch, 35, or 36, thereby setting the motor in operation to raise or lower, respectively, the block 25.

Through a secondary reduction gear 37 driven from the spindle of the reduction gear 31 the arm M₁ is driven to give an angular rotation of, say 60° for a given permissible range in temperature. The arm carries at its extreme radius, say 3 inches, a set of contacts, which is composed of two light silver contacts 38, 39, connected by means of light flexible connections 40, 41 (which may be carried down the arm M₁ to the hub) and thence to the grids of the thermionic valves 48, 51. Between the two contacts 38, 39 floats a platinum wire 42 mounted on the end of a moving coil milliammeter needle, designated M₂, the movement 43 of which is of the usual pattern.

The apparatus of which 10 is the diagrammatic representation in Fig. 1 is mounted on a separate panel, and consists of a pentode thermionic valve 44 and milliammeter 43, which transform the potential at the grid 44 into a positive displacement of member M₂. Direct current mains supply the heater and grid bias circuits; across the heater there are two large-capacity 2-volt accumulators 45 in series, and across the grid bias resistance 46 is a high tension battery 46a of any suitable voltage, say 20 volts. This latter also supplies (1) the graded potentiometer 5, which is attached to the wheel 4, and from which the point X derives its potential; and (2) the linear potentiometer 13 which is fixed, and from which the point Q derives its potential. The condenser 7, the resistances 8 and 9, the condenser 11 and the resistance 12 are substantially the same as in Fig. 1.

The anode current through the valve 44 is, under steady conditions, of a constant value, determined by the value of grid bias voltage at Q, and flows through the milliammeter 43, shunted by a variable resistance 47, to maintain a constant deflection of suitable magnitude. When, however, the temperature changes so as to close contacts 42 and 38, the grid potential of a valve 48 is increased from the negative value due to the grid bias battery 46a to that of the filament, the valve is rendered more conducting and the contactor coil winding 49 of the mercury reversing switch 50 is energised sufficiently to close the armature circuit of the steam valve motor VM in a certain direction from the terminals marked + and —, which may be connected directly or through a limiting resistance to any suitable source of electrical power, the field circuit of the motor VM being continuously supplied in one sense only from the same power source, which may be direct current or alternating current supply. The positive supply main is connected to the pentode heater via two resistances in series, 61, 62, so rated to pass the heater current continuously, of which 62 is adjusted to give a voltage drop adequate to supply valves 48 and 51. The direction of closing of the armature circuit of the motor VM is such as to cause the compensating means (i. e. the steam valve) to move in a direction to tend to restore the value of the temperature, and as the steam valve moves, the change in potential of the point X applies a changing potential to the right-hand plate of condenser 7, and causes a change in the potential of the point P which is the control grid potential of valve 44, through the intermediary of resistances 8 and 9. This latter change is of the correct polarity to change the value of anode current through the valve 44 in such a manner as to make the milliammeter needle M₂ follow the movement of the amplified temperature indicator M₁, i. e., to maintain the desired condition of correspondence, and is continuous until the platinum wire 42 is once more clear of contact 38. The converse is equally applicable when platinum wire 42 touches contact 39, whereupon valve 51 is rendered conductive to energise contactor winding 52 to close the mercury switch 50 in a reverse direction.

Momentary contact, due to mains fluctuations or other cause is, however, of itself incapable of rendering valve 48 or 51 conductive. Due to the inclusion of resistances 53 and 54 in the grid circuits of the valves, of condensers 55 and 56 in the grid-cathode circuits, and of by-pass resistances 57 and 58, contact must be maintained between wire 42 and contacts 38 or 39 for an appreciable time, say 5 seconds, before the grid attains its final potential; similarly, momentary breaking of contact does not interrupt the contactor circuit and cause chattering, since the grid condenser 55 or 56 does not immediately lose the grid potential but maintains it to a sufficient degree, for, say, 5 seconds.

The resistances 8, 9 and 12 however, any one of which may be variable, allow the charge on the control grid of valve 44 to leak away slowly until the potential at point P is once more restored to that of point Q, when the grid bias and anode current are once more at their normal values. Hence the milliammeter needle M₂ slowly restores itself to the mean position of constant deflection, intermittently causing wire 42 to touch contact 38 or 39 and hence altering the setting of the compensating means, and since this can only occur concurrently with the restoration of the indicated temperature to its normal value, the value is further compelled to stabilise itself in a position suited to the changed conditions.

It is well known, of course, that the leakage rates through the respective resistances 8, 9 and 12 are governed entirely by the potentials across them. The mathematical discussion which explains their actions has been set forth at the end of this specification.

The potential at the point P may be modified by insertion or alteration of the resistances 59 and 60, which are controlled by variations in the magnitude of any causal characteristic, or of a number of pairs of these resistances, corresponding to the number of causal characteristics it is necessary to consider, as has been previously described.

For example, let it be supposed that the pressure of the heating medium is being regarded as a causal characteristic. If the pressure changes, which would lead eventually, i. e., after an interval of time peculiar to the system under control, to a change in temperature, the resistances 59 and 60 are directly increased and/or decreased by an appropriate amount, causing the potential at point P to change, whereupon the control system operates as though the temperature had already changed, although it has not yet been affected by the change in pressure of the heating medium. Thus, the control system anticipates the effect of variations in the causal characteristic and the control is smoother than would otherwise be obtained. In some cases it may be desirable to delay the action of the causal control.

Figure 3:
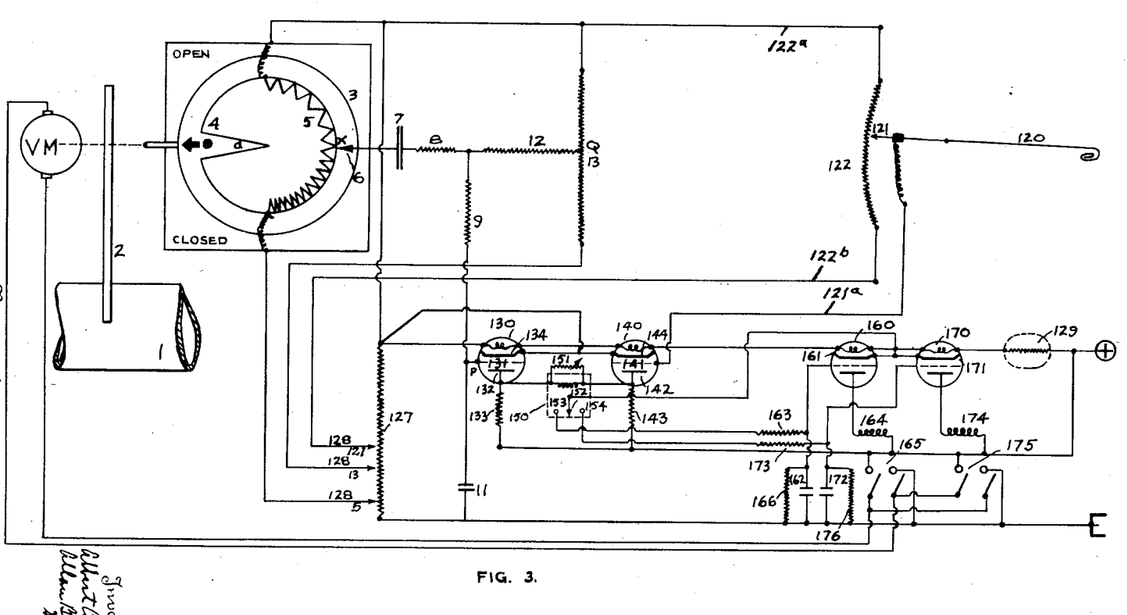
Fig. 3 is a similar diagram of a modified system.

The arrangement shown in Fig. 3 is relatively similar to that of Fig. 2. The moving members M₁, M₂ are replaced by parallel currents which vary the proportion of the deviation and the movement of the compensating means respectively; and the operation of the motor is governed by relative variations between said currents operating through a double contact reversing relay. The manner of functioning of the arrangement shown in Fig. 3 is fundamentally the same as that described in connection with Fig. 2.

Figures 3A, 6:
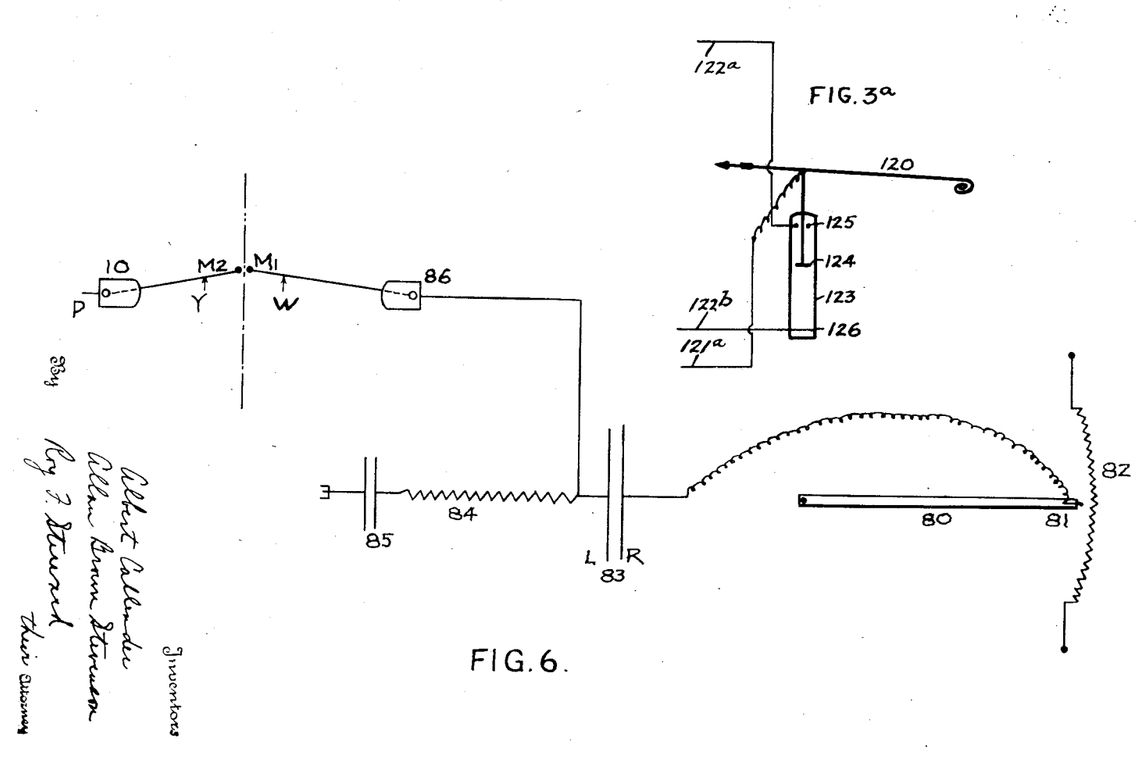
Fig. 3a shows a modified form of resistance for use in the circuit illustrated in Fig. 3.
Fig. 6 is a diagram illustrating the addition of an exponential factor to the arrangement illustrated in Fig. 1.

Referring to Fig. 3, the thermometer, or other indicator, 120, carries at its insulated extremity a light contact 121 made of platinum or other noble metal, which bears on the close meshed resistance 122 of a potentiometer system, across the opposite ends 122a, 122b, of which a potential of, say, 20 volts, is applied. The metallic resistance 122 may alternatively be replaced by a liquid resistance 123, as shown in Fig. 3a, for example, in which the moving electrode 124 moves between the two fixed electrodes 125, 126, the electrolyte being water or any other inorganic or organic liquid with a high specific resistance.

Resistance 5 is connected in parallel with resistance 122 (or 123) and resistance 13, i. e., substantially across the same source of E. M. F. 127, but the voltage applied across each resistance need not be the same. Tapping point 6 is led via its network of condenser 7, resistances 8, 9 and 12, and condenser 11 to point P which is the grid 131 of a triode or pentode amplifying valve 130 of large handling capacity, the anode 132 of which is connected to a positive potential of, say, 200 volts or over with respect to earth, via a resistance 133 of approximately 10 times the value of the resistance of relay 150, of which one terminal of the moving coil is connected to the anode 132. The cathode 134, which may be directly or indirectly heated, is connected, in common with cathode 144, to earth.

Tapping point 121 (or 124 in Fig. 3a) is led by connection 121a direct to the grid 141 of a similar triode (or pentode) amplifying valve 140, the anode 142 being connected to the same potential via a resistance 143 of the same value as resistance 133, the second terminal of relay 150 being connected to anode 142.

In series with the two filament heaters on the negative side is a resistance 127, which is sufficient to give a voltage drop of, say, 40 volts, when the heater current is flowing. In parallel with this resistance and each having one end connected to the common connection between cathodes and heater circuit the three parallel potentiometers 5, 13 and 122 (or 123) are arranged, the other ends terminating in three sliding contacts 128₅, 128₁₃, 128₁₂₁. A barretter or loading resistance 129 is included in the positive side.

Relay 150 is a sensitive low-consumption microammeter type and is provided with an adjustable shunt 151 across its moving coil terminals. It is caused to move its light contact 152 to left or to right according as the circuit composed of resistance 133 and valve 130 carries more or less current than the parallel circuit 143, 140. Since 133 and 143 are invariable, the relative impedances of valves 130 and 140 decide the movements of contact 152, and in practice these impedances are determined by the negative potentials applied to each grid. The object of the relay 150 is to cause as a first consideration the negative potential derived from resistance 5 and applied to valve 130 to follow in stepwise manner the changes in negative potential derived from movements of the thermometer arm 120 as interpreted by contact 121 (or 124) on resistance 122 (or 123) and applied to valve 140. When the two negative potentials are unequal, and the anode currents therefore unequal, the relay 150 closes its light contact 152 to touch either contact 153 or contact 154.

In the former case valve 160 is caused to raise its grid potential from earth to that of the cathode 161, due to charging of the condenser 162 through delay resistance 163, until the contactor coil winding 164 of the contactor 165 is sufficiently energised to close the armature circuit of the steam valve motor VM in a certain direction. This direction is such as to cause the steam valve to move in a direction to tend to restore the temperature and as the steam valve moves the change in potential of the point X applies a changing potential to the left hand plate of condenser 7 and causes a change in the potential of the point P which is the control grid negative potential of the valve 130. This change is of the same polarity as the change in potential applied to valve 140 from thermometer arm 120 and when the magnitudes are the same, the anode currents in resistances 133 and 143 are equal and relay 150 is completely de-energised. Before this, however, the contacts 152 and 153 will open circuit; valve 160 does not, however, immediately cease to conduct, but will conduct until the condenser 162 is sufficiently discharged through resistance 166 to lower the anode current in contactor coil winding 164 below its "hold-on" value; this time interval may, by varying resistance 166, be adjusted to be equal to the interval between parting of contacts 152 and 153, and absolute equality of the anode currents.

In a similar manner, contact on the right hand side between 152 and 154 raises the grid potential of valve 170 to that of its cathode 171 by charging condenser 172 through delay resistance 173; energises the coil winding 174 of contactor 175 to close the armature circuit of valve motor VM in the opposite direction; and when the grid potentials are again equal, or nearly equal, de-energises winding 174 by opening contacts 152 and 154, whereupon condenser 172 discharges through resistance 176.

Momentary contacts due to mains fluctuations or other cause, are rendered innocuous as described with reference to Fig. 2 by means of delay resistances 163 and 173 in the grid circuits of valves 160 and 170 charging condensers 162 and 172 and by leakage resistances 166 and 176. In this embodiment of the invention, the features which are equivalent to the unit 10 in Fig. 1 are the thermionic valve 130 and the microammeter relay 150, which transform the potential at P into differential changes of pointer 152, while the potentiometer 120—122 and valve 140 give the balancing potential and opposing movement derived from the temperature value.

Figure 4:
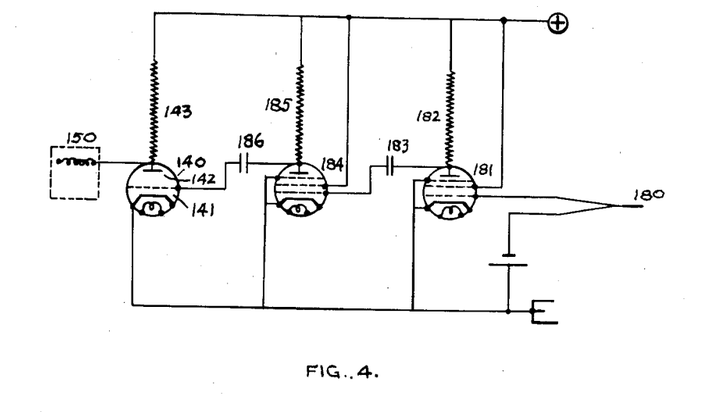
Fig. 4 is a diagram indicating a method of connecting a thermocouple to the system shown in Fig. 3.

An arrangement similar to that shown in Fig. 3 but employing a thermocouple in place of a thermometer with its physically interpretable displacement may now be described with reference to Fig. 4, which shows that part of the system previously represented by thermometer arm 120, contact 121 and potentiometric resistance 122, or alternatively electrodes 124, 125, 126, and liquid resistance 123. The E. M. F. of thermocouple 180 is applied direct to the grid of a steep-slope pentode valve 181, which by means of suitably proportioned values of anode resistance 182 and coupling condenser 183 amplifies the comparatively small changes in voltage to give a stage gain of, say, 200, and applies its output to a second steep-slope valve 184, with anode resistance 185 and coupling condenser 186, giving the same stage gain, so that the net effect is an output of not less than 1 volt per degree centigrade. This output is then finally applied to the grid 141 of the output triode (or pentode) valve 140, with its anode resistance 143, substantially as hereinbefore described.

In certain cases where very large time lags are involved in the plant to be controlled, the size of the condenser 7, which for a given decrement is proportional to the time lag, will become unduly large and the cost a deterrent. Since electrolytic condensers are inadmissible owing to the internal losses, an alternative is to be found in an electro-chemical polariser, of the type known in the industry as a Daniell's cell. In this particular application, current is fed at a constant rate to the cell for the duration of time that the valve motor VM is running, in one direction or the other according to whether contactor 165 or 175 has operated. Passage of current through the cell builds up an increasing E. M. F. (with a limit of approximately 1.43 volts) in that sense in which the current is flowing, while subsequent reversal of this current will first gradually depolarise the cell in the same time that it took to polarise and then build up an increasing E. M. F. in the opposite sense.

Figure 5:
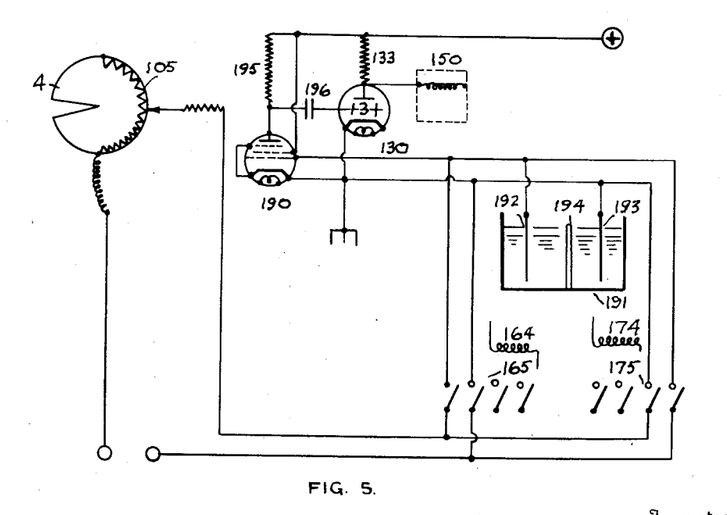
Fig. 5 is a view of a portion of the system shown in Fig. 3 indicating an arrangement substituting an electrochemical cell for the initial condenser.

Referring now to Fig. 5, the electro-chemical cell 191 with its electrodes 192 and 193 and porous diaphragm 194 in a cuprous salt solution is connected in the grid circuit of a steep-slope pentode amplifying valve 190 which together with anode resistance 195 and coupling condenser 196 applies an amplified E. M. F. to the output valve 130, which is, as hereinbefore described, coupled to anode resistance 133 and to the relay 150. Contactor 165 or 175, as it closes, applies a small current in one direction or the other to the circuit of the electro-chemical cell via the resistance 105 mounted on wheel 4, which, as before, is loosely coupled to the valve indicator. Resistance 105 differs from the potentiometer 5 in that it is designed to compensate for non-linearity of the compensating means by passing a greater current at the more critical positions of the valve, instead of applying a greater voltage. The mean current may be of the order of say 100 microamps, depending on (a) the size of electrochemical cell (b) the speed of the valve (c) the length of the time lag in the plant. The E. M. F. generated by ionisation or de-ionisation in the cell is then applied to the grid of the valve 190 to render the latter more negative or less negative, according to the motion of the steam valve, and the amplified voltage on grid 131 governs the output of valve 130.

As shown in Fig. 5, the only leakage across the cell tending to equalise the potentials on the two electrodes is the internal grid to cathode resistance of the valve 190. This is of a very high order, so that the decrement in grid voltage is very low, being thus suited to long time lags. If it should be desired to use the same size of electro-chemical cell for shorter time lags of, say, one-half of the previous duration, a parallel resistance equal to the internal grid cathode resistance of the valve is inserted, and corresponding values for all other time lags.

A diagrammatic representation of the extra arrangements necessary for the extension of the basic form of the invention, whereby an exponential factor is introduced, is given in Fig. 6. This law, which can now be conveniently represented only by use of two equations is:

$$-V = k_1 \int \chi \, dt + k_2 \chi + k_3 \frac{d\chi}{dt}$$

where $\chi$ is defined by:

$$\frac{d\chi}{dt} + c\chi = c\alpha\theta + \beta \frac{d\theta}{dt}$$

$c$, $\alpha$ and $\beta$ being chosen constants.

In Fig. 6 of the accompanying drawings 80 represents either the temperature indicating arm itself or an arm so driven that it amplifies the movements of the temperature indicating arm. An example of such amplification has already been given with reference to Fig. 2. At the extremity of 80 a contact 81 bears on the resistance 82 of a potentiometer system, thus imparting to plate R of condenser 83, changes of potential sensibly proportional to changes in θ. Plate L is connected through resistance 84 and condenser 85 to a constant potential and is also connected to an indicator of potential 86, the indicating arm of which may be designated M₁, the movements of which are utilised in the same manner as those of arm M₁, in Figs. 1 and 2. Indicator 86 (which is indicating $\chi$ by a displacement $w$) may be of the same form as indicator 10, details of which have already been described with reference to Fig. 2.

In this embodiment of the invention let $x$ be the potential applied at the end of arm 80 (proportional to θ, the error of the variable) and let $w$ be the potential applied to the indicator 86. The potential at the grounded end may be regarded as zero.

Calling capacities C, resistances R and currents $i$, then $$x = R_{84} i + \left[ \frac{1}{C_{83}} + \frac{1}{C_{85}} \right] \int i \, dt$$

and $$w = R_{84} i + \frac{1}{C_{85}} \int i \, dt$$

therefore $$\frac{dx}{dt} = R_{84} + \left[ \frac{1}{C_{83}} + \frac{1}{C_{85}} \right] i$$

and $$\frac{dw}{dt} = R_{84} + \frac{1}{C_{85}} \cdot i$$

Eliminating $i$, then $$\frac{dw}{dt} + \frac{1}{R_{84}} \left[ \frac{1}{C_{83}} + \frac{1}{C_{85}} \right] w = \frac{dx}{dt} + \frac{1}{R_{84}} \cdot \frac{1}{C_{85}} \cdot x$$

so that the deflection $\chi$ of the indicator 86, which is proportional to $w$, obeys a law of the form $$\frac{d\chi}{dt} + c\chi = c\alpha\theta + \beta \frac{d\theta}{dt}$$

The physical, as apart from the mathematical, explanation of this behaviour is that on the occurrence of a change in the position of the arm 80, say in an increasingly positive direction, a pulse of potential is applied to the right hand plate of condenser 83, which immediately charges up the opposite side by the same amount; subsequently, however, this charge leaks away to the right hand side of condenser 85 through resistance 84 (which governs the rate of leakage) so that the potential of indicator 86 first rises equally with that of contact 81, then falls exponentially to some value less than that of 81 (and governed by the relative sizes of condenser). In analogous manner, therefore, a linearly rising characteristic of the arm 80 would cause an initially parallel rise of potential at indicator 86, followed by an exponential drift of the potential to some other linear rise of lesser gradient. By suitable choice of the voltage across 82 and the lengths of arms 80 and 86, the net effect of such additional device is to give an exaggerated behaviour of the variable to indicator 86.

The object of exponentially exaggerating the variations of the indicator 80 is to produce momentarily a compensating effect which is greater than that required to neutralize the disturbance to which the variations of the indicator are due, thus restoring more quickly the desired value of the quantity in cases where sudden variations of the same occur.

In cases where there is no direct current supply available but only alternating current, the systems as shown in Figs. 2, 3, 4 and 5 may be modified to have the filament heater supplies of individual valves connected in parallel to a transformer winding of 4-volt secondary output, while the high tension direct current is supplied from a rectifier of thermionic valve or copper oxide type; substantially as employed in alternating current radio receivers. The valve motor may be single or 3-phase.

It will be understood that the systems and modifications illustrated in the drawings may be applied to the control of various mechanical, electrical, physical, chemical or other characteristics, although for the sake of simplicity they have been described in connection with the control of temperature. The specific systems and modifications shown and described are intended as examples illustrative of the principles of the invention, which is not limited to the specific disclosure.

Various modifications of the systems previously described may be made in carrying out our invention, and all such modifications are intended to come within the scope of the appended claims insofar as they achieve to a useful degree the new results, improvements and advantages hereinbefore described.

To demonstrate mathematically the action which occurs in the electrical systems hereinbefore described, the following is submitted:

As was stated hereinbefore the leakage rates through the resistances 8, 9 and 12, as is well known, are governed entirely by the potential across them. How they fit into the system as a whole will now be explained with reference to the diagrammatic view, Fig. 1. The value of the respective resistances are indicated by $R_8$, $R_9$, $R_{12}$.

Let the potential at point P at any given moment be designated by $\theta$. Then the current into condenser 11, will be a function of the capacity $C_{11}$ and of the voltage $\theta$ and may be indicated as $C_{11}\dot{\theta}$, wherefore the potential $E_0$ at the junction common to the resistances 8, 9 and 12, Fig. 1, will be $\theta + R_9 C_{11}\dot{\theta}$.

The potential E at the point Q is fixed, and for purposes of calculation may be assumed as zero, whereupon the current through the resistance 12 will be determined. It is: $\theta + R_9 C_{11}\dot{\theta}/R_{12}$.

The current through the resistance 8 is
— (current through 12 + current through 9),
that is, $$-[C_{11}\dot{\theta} + (\theta + R_9 C_{11}\dot{\theta})/R_{12}]$$

or $$-[\theta + (R_9 + R_{12})C_{11}\dot{\theta}]/R_{12} \quad (2)$$

Let $E_r$ designate the potential at the right hand plate of condenser 7, Fig. 1. Then the current into the condenser 7 will be $$(E_0 - E_r)/R_8$$

or $$(\theta + R_9 C_{11}\dot{\theta} - E_r)/R_8 \quad (3)$$

From the two Formulae 2 and 3 there can be deduced the 3-term equation hereinbefore set forth, namely:

$$-V = k_1 \int \theta . dt + k_2 \theta + k_3 \frac{d\theta}{dt}$$

The steps by which the deduction is made will now be indicated.

Equating (2) and (3)

$$E_R/R_8 = (\theta + R_9 C_{11}\dot{\theta})/R_8 + (\theta + (R_{12} + R_9)C_{11}\dot{\theta})/R_{12}$$

or $$E_R = \frac{1}{R_{12}}[(R_{12} + R_8)\theta + \{R_{12}(R_9 + R_8) + R_9 R_8\}C_{11}\dot{\theta}] \quad (4)$$

Now $\frac{1}{C_7}$ (current into $C_7$) = $\frac{d}{dt}$ (potential across $C_7$)

i. e.

$$\frac{1}{C_7}[i_8] = \frac{dE_x}{dt} - \frac{dE_R}{dt} \quad (A)$$

where $E_x$ is the potential at X.

Using (2), (4) and (A)

$$\frac{dE_x}{dt} = \frac{1}{C_7 R_{12}}[\theta + (R_9 + R_{12})C_{11}\dot{\theta}] +$$

$$\frac{1}{R_{12}}[(R_{12} + R_8)\dot{\theta} + \{R_{12}(R_8 + R_9) + R_8 R_9\}C_{11}\ddot{\theta}] =$$

$$\frac{1}{C_7 R_{12}}[\theta + \{(R_{12} + R_9)C_{11} + (R_{12} + R_8)C_7\}\dot{\theta} +$$

$$\{R_{12}(R_8 + R_9) + R_8 R_9\}C_7 C_{11}\ddot{\theta}] \quad (5)$$

Now $E_x$ is proportional to $-V$, the value of the compensating effect, so that Equation (5) can be generalised in the form $$-\frac{dV}{dt} + k_1 \theta + k_2 \frac{d\theta}{dt} + k_3 \frac{d^2\theta}{dt^2}$$

and integrating $$-V = k_1 \int \theta . dt + k_2 \theta + k_3 \frac{d\theta}{dt}$$

where $$k_1 = \frac{1}{C_7 R_{12}}$$

$$k_2 = \frac{1}{C_7 R_{12}}[(R_{12} + R_9)C_{11} + (R_{12} + R_8)C_7]$$

$$k_3 = \frac{1}{C_7 R_{12}}[\{R_{12}(R_8 + R_9) + R_8 R_9\}C_7 C_{11}]$$

The values of resistances 8, 9 and 12 in combination with the sizes of condensers 7 and 11, govern the time-rate of change of potential at the point P and the values of the constants in the main equation.

In the simple two-term case (e. g., Fig. 5) the rate of leakage of current through the resistance (192—193) governs the re-setting rate of the steam (or other) valve movement, and hence in conjunction with the capacity of the cell 191 fixes the ratio of "re-setting" to "proportional" factors $k_1$ and $k_2$.

We claim:

1. A system for the automatic control of a variable characteristic comprising means proportionally responsive to deviations of the characteristic from a desired value, compensating means for adjusting the value of the characteristic, and electrical means associated with and actuated by responsive variations in said responsive means, for operating the compensating means to correct such deviations in conformity with the sum of the extent of the deviation and the summation of the deviation.

2. A system as set forth in claim 1 in which the operating means comprises a static electrical system, means for applying to the system a varying potential proportional to the variations in the compensating effect, potential-responsive means for operating the compensating means, and static electrical means for regulating the operation of the potential-responsive means, for transmitting said applied changes in potential thereto in conformity with the extent and the summation of a deviation of said physical characteristic.

3. A system as set forth in claim 1 in which said operation is additionally controlled in conformity with the rate of such deviation.

4. A system for the automatic control of a variable physical characteristic comprising an indicator of the value of said physical characteristic; compensating means for restoring the desired value of the physical characteristic following any departure therefrom; a reversible servomotor actuating said compensating means; a relay system controlling operation of the servomotor, the relay system being responsive to variations of the indicator; means for producing at a given point changes of an electrical characteristic corresponding to changes in the compensating effect of the compensating means; means responsive to changes in said electrical characteristic for controlling the relay system; and an electrical system including a circuit connecting said point and the responsive means, for the controlled transmission of changes in said electrical characteristic from said point to the responsive means and for gradually restoring said electrical characteristic at the responsive means to a predetermined value.

5. A system as set forth in claim 4 including means providing a correction for backlash in the action of the compensating means, said correction means including a lost motion drive connection between the servomotor and the change-producing means.

6. A system for the automatic control of a variable physical characteristic comprising an indicator of the value of said physical characteristic; compensating means for restoring the desired value of the physical characteristic following any departure therefrom; a reversible servomotor actuating said compensating means; a relay system controlling the operation of the servomotor, the relay system being responsive to variations of the indicator; means for producing at a given point changes of electrical potential corresponding to changes in the compensating effect of the compensating means; potential-responsive means for controlling the relay system; and a static electrical system including a circuit connecting said point and the potential-responsive means, provided with means, interposed between said point and the responsive means, for the transmission of changes in potential from said point to the responsive means and for gradually restoring the potential at the responsive means to a predetermined value.

7. A system as set forth in claim 6 in which the static electrical system comprises a condenser, one plate of which is directly connected to said point and the other plate of which is connected through a resistance to a point of predetermined potential corresponding to the desired value of the physical characteristic to be controlled, said other plate also being connected to the potential-responsive means.

8. A system as set forth in claim 6 in which the static electrical system comprises a condenser, one plate of which is directly connected to said point and the other plate of which is connected through two resistances in series to a point of predetermined potential corresponding to the desired value of the physical characteristic to be controlled, a point between said two resistances being connected through a resistance to the potential-responsive means and thence through a condenser to a point of constant potential.

9. A system as set forth in claim 6 comprising means for amplifying the variations of said indicator, said amplifying means comprising means for causing variations of the indicator to produce proportional changes of electrical potential at a selected point in a second static electrical system comprising a condenser, one plate of which is directly connected to said selected point and the other plate of which is connected through a resistance and a condenser in series to a point of constant potential, said other plate also being connected directly to a potential-responsive member to control the relay system.

10. A system as set forth in claim 6 including two thermionic valves, means for applying to the control grid of the first valve the modified potential derived from the static electrical system, means for applying to the control grid of the second valve a potential proportional to the variations of the indicator, and current-operated reversing switch means actuated by variations in relative current strength of the output of the valves and controlling the operation of the servomotor.

11. A system as set forth in claim 6 in which the physical characteristic is temperature and the indicator is a thermocouple, said system including thermionic valve means for amplifying the voltage produced by the thermocouple, and means for actuating the relay system in conformity with the proportional relationship between said voltage and the potential applied to the potential-responsive means.

12. A system for the automatic control of a variable physical characteristic comprising an indicator of the value of the characteristic to be controlled, compensating means for varying said characteristic, a reversible servomotor for actuating the compensating means, and a relay system controlling the operation of the servomotor and responsive to variations of the indicator from a normal position corresponding to the desired value of the characteristic; a reversible electrochemical cell; means for passing through said cell a quantity of electricity proportional to variations in compensating effect caused by actuation of the compensating means; and means for controlling the relay system responsive to the potential of the electrochemical cell.

13. A system as set forth in claim 12 in which one pole of the electrochemical cell is connected to a point of constant potential and the other pole is connected to the control grid of a thermionic valve, the output of which is applied to a circuit associated with the potential-responsive means for controlling the relay system.

14. A system as set forth in claim 6 in which the potential-responsive means includes a thermionic valve whose control grid is connected to the static electrical system and a current-responsive member actuated by the output of the valve and associated with the indicator; and means actuated by variations from predetermined proportionality between the movement of the indicator and the current-responsive member is provided for actuating the relay system to restore said proportionality.

ALBERT CALLENDER.
ALLAN BROWN STEVENSON.